(12) United States Patent
Sayers et al.

(10) Patent No.: US 10,518,481 B2
(45) Date of Patent: Dec. 31, 2019

(54) GASKET WELDING APPARATUS

(71) Applicant: The Filta Group Ltd., Rugby, Warwickshire (GB)

(72) Inventors: Roy C. Sayers, Weybridge (GB); Jlubormir Urosevic, Rugby (GB)

(73) Assignee: The Filta Group Ltd, Rugby (GB)

( * ) Notice: Subject to any disclaimer, the term of this patent is extended or adjusted under 35 U.S.C. 154(b) by 125 days.

(21) Appl. No.: 15/286,796

(22) Filed: Oct. 6, 2016

(65) Prior Publication Data
US 2017/0100881 A1    Apr. 13, 2017

(30) Foreign Application Priority Data
Oct. 8, 2015    (EP) .................................... 15189027

(51) Int. Cl.
| B29C 65/20 | (2006.01) |
| B29C 65/00 | (2006.01) |
| B29L 31/26 | (2006.01) |

(52) U.S. Cl.
CPC ............. *B29C 65/20* (2013.01); *B29C 66/84* (2013.01); *B29C 66/942* (2013.01); *B29C 66/95* (2013.01); *B29L 2031/265* (2013.01)

(58) Field of Classification Search
CPC . B29C 65/20; B29C 65/2061; B29C 65/7841; B29C 66/0042; B29C 66/1162; B29C 66/43421; B29C 66/52431; B29C 66/71; B29C 66/73921; B29C 66/8242; B29C 66/84; B29C 66/9141; B29C 66/942; B29C 66/95
See application file for complete search history.

(56) References Cited

U.S. PATENT DOCUMENTS

| 4,284,464 A * | 8/1981 | Forster ...................... B26F 3/06 |
| | | 156/510 |
| 4,971,639 A * | 11/1990 | Quinn ................. B29C 65/2084 |
| | | 156/304.2 |
| 5,332,204 A | 7/1994 | Puppin |
| 5,385,628 A | 1/1995 | Davis et al. |

(Continued)

FOREIGN PATENT DOCUMENTS

| DE | 19 24 136 | 9/1965 |
| DE | 88 12 591 | 11/1989 |

(Continued)

OTHER PUBLICATIONS

Translation of DE 1924136, published in German, Sep. 23, 1965 (Year: 1965).*

(Continued)

*Primary Examiner* — George R Koch
(74) *Attorney, Agent, or Firm* — Walters & Wasylyna LLC (57) ABSTRACT

A gasket welding apparatus (10) comprising: a pair of opposed clamping members (16A, 16B) for supporting corresponding first and second lengths of gasket material. The clamping members (16A, 16B) being moveable towards and away from one another by an actuator (58). The gasket welding apparatus (10) comprises a heating element (30), the heating element (30) is moveable between a first position in which it is removed from the clamping members and a second position in which it is disposed between the clamping members.

19 Claims, 5 Drawing Sheets

(56) References Cited

U.S. PATENT DOCUMENTS

| | | | | |
|---|---|---|---|---|
| 5,599,419 A | * | 2/1997 | Hunter | B29C 66/1162 |
| | | | | 156/281 |
| 2006/0065358 A1 | * | 3/2006 | Cupp | B29C 37/04 |
| | | | | 156/267 |
| 2010/0175827 A1 | * | 7/2010 | Eisenbach | B29C 65/2023 |
| | | | | 156/322 |

FOREIGN PATENT DOCUMENTS

| | | |
|---|---|---|
| DE | 39 06 278 | 8/1990 |
| DE | 10 2007 043 195 | 3/2009 |
| DE | 10 2008 012 021 | 9/2009 |
| GB | 2422573 | 10/2007 |

OTHER PUBLICATIONS

European Patent Office, Extended European Search Report, EP 15 18 9027 (dated Mar. 17, 2017).
Wolfgang Kazmirzak: "Heizelement-Schweissen fuer hochschmelzende Kunststoffe", Kunstoffe, Carl Hanser Verlag, Munchen, DE, No. 10, Oct. 1, 2006 (Oct. 1, 2006), pp. 225-228.

\* cited by examiner

GASKET WELDING APPARATUS

PRIORITY

This application claims priority European Pat. App. No. EP15189027.4 filed on Oct. 8, 2015, the entire contents of which are incorporated herein by reference.

FIELD

The present invention relates to a gasket welding apparatus for welding together the ends of heat fusible gasket members.

BACKGROUND

The use of ribbon-like strips of flexible resilient elastomeric or similar deformable material to seal the closure gaps between refrigerator doors and cabinets, or the like, is well known. The strips are applied marginally, either directly or with the aid of a track, onto one or both of the facing surfaces of the door perimeter or the abutting shoulder of the cabinet frame. The gasket profile is filled out with a magnetic strip or elastically compressible sponge or other filler to ensure that the gap between the shoulder and the frame is filled.

U.S. Pat. No. 5,385,628 to Davis et al discloses an apparatus for welding together the ends of heat fusible gasket members. The apparatus is portable, thus enabling the gasket to be cut and fitted to the refrigerator, or the like, in situ, without the need to take the refrigerator away or to have to return to a factory to prepare the gasket. However, the apparatus of U.S. Pat. No. 5,385,628 requires a skilled operator in order to produce consistent and high quality welded joints.

It is the object of the present invention to alleviate some of the problems of the prior art, or at least to provide an alternative apparatus for gasket welding.

SUMMARY

According to the present invention there is provided a gasket welding apparatus comprising: a pair of opposed clamping members for supporting corresponding first and second lengths of gasket material. The clamping members being moveable towards and away from one another. The gasket welding apparatus comprises a heating element, the heating element is moveable between a first position in which it is removed from the clamping members and a second position in which it is disposed between the clamping members.

In some embodiments the apparatus comprises a gasket cutting guide for providing a guide to enable lengths of gasket material to be cut in preparation for welding. The gasket cutting guide may comprise a slot in each clamping member which defines a line at which the gasket is to be cut.

The clamping members may comprise complementary jig and clamp sets, respectively mounted on first and second plates which are laterally spaced across a gap. The clamping members may be provided with gasket profile matching cavities that define hollow channels for respectively supporting the first and second lengths of gasket material. The clamping members may be configured to support the first and second lengths of gasket material at rights angles.

One aspect of the present disclosure provides a gasket welding apparatus comprising a first clamping member for supporting a first length of gasket material, the first clamping members comprising a first pair of jaws being moveable towards and away from one another and a second clamping member for supporting a second length of gasket material, the second clamping member comprising a second pair of jaws being moveable towards and away from one another. The first and second clamping members are movable with respect to each other. The apparatus comprises a heating element, the heating element is moveable between a first position in which it is removed from the clamping members and a second position in which it is disposed between the clamping members. The apparatus may comprise a first actuator for moving the first and second clamping members towards and away from one another. The apparatus may comprise a second actuator for moving the heating element between the first position and the second position. The apparatus may comprise a control unit for controlling operation of the first and second actuators. In this way the control unit automates the welding operation.

One advantage of the present apparatus is that the welding operation is automated, it requires less input from operators, such as refrigerator servicemen, to weld the gasket lengths. This improves the consistency and quality of the welds and reduces the likelihood of an imperfect seal being formed when the gasket is fitted.

Optionally, the apparatus comprises a temperature controller for controlling the temperature of the heating element. The temperature controller may comprise a temperature sensor. The control unit is in communication with the temperature controller.

Optionally, the control unit comprises a timer. The control unit may activate the second actuator so as to move the heating element from the second position to the first position in response to receiving a signal from the timer. The control unit may activate the first actuator so as to move the first and second clamping members towards each other.

Optionally, each of the first and second clamping members is provided with a gasket cutting guide.

Optionally, the apparatus is provided with heated gasket cutter in conjunction with the gasket cutting guide.

Optionally, the heating element is detachably coupled to, or unpluggable from, the apparatus.

Optionally, the heating element comprises a thermally resistant, non-stick material on operative surfaces thereof.

In some embodiments, at least one of the jaws of the first pair of jaws is reciprocally moveable along a first path, the first path having a first end defined by a first end stop, said at least one jaw being biased towards the first end stop.

Optionally, the first pair of jaws are moveable towards and away from one another by an overcentre mechanism.

The first path may comprise a second end defined by a second end stop, the first pair of jaws may be coupled to an overcentre mechanism and the said at least one jaw may be biased towards the first or second end stop in dependence upon the state of the overcentre mechanism.

Optionally, the apparatus comprises at least one preset welding program defining a set of instructions configured for welding gasket lengths in dependence upon the gasket characteristics.

A further aspect of the present disclosure provides a gasket welding apparatus comprising a pair of opposed clamping members for supporting corresponding first and second lengths of gasket material, the clamping members being moveable towards and away from one another. The apparatus comprises a heating element, the heating element being moveable between a first position in which it is removed from the clamping members and a second position in which it is disposed between the clamping members. The heating element may comprise a thermally resistant, non-stick material on operative surfaces thereof.

The heating element may be detachably coupled to the apparatus.

Another aspect of the present disclosure provides a method for automated operation of a gasket welding apparatus comprising:

a first clamping member supporting a first length of gasket material, the first clamping members comprising a first pair of jaws being moveable towards and away from one another;

a second clamping member supporting a second length of gasket material, the second clamping member comprising a second pair of jaws being moveable towards and away from one another;

the first and second clamping members being movable with respect to each other;

a first actuator for moving the first and second clamping members towards and away from one another;

a heating element, the heating element being moveable between a first position in which it is removed from the first and second clamping members and a second position in which it is disposed between the first and second clamping members;

a second actuator for moving the heating element between the first position and the second position; and a control unit for controlling operation of the first and second actuators; the method comprising:

initiating a welding operation;

actuating the first actuator to separate the first and second clamping members;

actuating the second actuator to move the heating element into the second position between the first and second clamping members;

determining that a predefined period of time has elapsed;

actuating the second actuator to move the heating element into the first position removed from the first and second clamping members; and actuating the first actuator to move the first and second clamping members so as to bring the first and second gasket lengths into contact with each other.

Yet another aspect of the present disclosure provides a gasket welding apparatus comprising a pair of opposed clamping members for supporting corresponding first and second lengths of gasket material, the clamping members being moveable towards and away from one another. The apparatus comprises a heating element, the heating element being moveable between a first position in which it is removed from the clamping members and a second position in which it is disposed between the clamping members. The apparatus may comprise a counter which keeps a tally or count of the number of welds the apparatus has performed.

Optionally, the counter may a sensor for detecting that a welding operation has been performed. For example, but not limited to, the sensor may detect: movement of heating element or carriage between the rest position and the operative position; actuation of the start button or actuation of an actuator driving the heating element or clamping members.

Still yet another aspect of the present disclosure provides a gasket welding apparatus comprising a pair of opposed clamping members for supporting corresponding first and second lengths of gasket material, the clamping members being moveable towards and away from one another. The apparatus comprises a heating element, the heating element being moveable between a first position in which it is removed from the clamping members and a second position in which it is disposed between the clamping members. The apparatus may comprise a recording device to record information or data about use of the apparatus. The recording device may comprise or be in communication with a memory storage device which stores usage information. The apparatus may include a tracking device to determine the geographical locations in which apparatus is operated.

For example, but not limited to the data recorded may provide an indication of the geographical locations of use, number of welds carried out, the preset program which is implemented, the identity or other characteristics of the jig and clamp set utilized, the frequency a given jig and clamp set is used, characteristics of the welding operation such as dwell time, temperature setting or temperature measurement.

Within the scope of this application it is envisaged and intended that the various aspects, embodiments, examples, features and alternatives set out in the preceding paragraphs, in the claims and/or in the following description and drawings may be taken independently or in any combination thereof. For example, features described in connection with one embodiment are applicable to all embodiments unless there is incompatibility of features.

BRIEF DESCRIPTION OF THE DRAWINGS

Embodiments of the invention will now be described with reference to the accompanying drawings, in which.

DETAILED DESCRIPTION

Detailed descriptions of specific embodiments of a gasket welding apparatus and method of welding gaskets are disclosed herein. It will be understood that the disclosed embodiments are merely examples of the way in which certain aspects of the invention can be implemented and do not represent an exhaustive list of all of the ways the invention may be embodied. Indeed, it will be understood that the gasket welding apparatus and the method described herein may be embodied in various and alternative forms. The Figures are not necessarily to scale and some features may be exaggerated or minimized to show details of particular components. Well-known components, materials or methods are not necessarily described in great detail in order to avoid obscuring the present disclosure. Any specific structural and functional details disclosed herein are not to be interpreted as limiting, but merely as a basis for the claims and as a representative basis for teaching one skilled in the art to variously employ the invention.

Referring to FIGS. 1 to 4, there is shown an embodiment of a gasket welding apparatus 10. Apparatus 10 includes a housing 12 having an upper surface above which are positioned a pair of carriers or plates 14A, 14B. Each of the pair of plates 14A, 14B may be planar and generally rectangular in shape; the pair of plates 14A, 14B may be arranged to be substantially horizontal. The pair of plates 14A, 14B comprises opposing longitudinally extending parallel edges E1, E2 laterally spaced across a gap G (see FIG. 3).

Each plate 14A, 14B carries a complementary jig and clamp set 16A, 16B respectively. A first jig and clamp set 16A provides a first channel 20A for supporting a first section of a gasket. A second jig and clamp set 16B provides a second channel 20B for supporting a second section of a gasket.

A first guide rail 27A is mounted to a first plate 14A. A second guide rail 27B is mounted to a second plate 14B.

Each of the jig and clamp sets 16A, 16B comprises a jig 18A, 18C and a complementary clamp 18B, 18D. The jigs 18A, 18C are fixed in position on the upper surface of the respective one of the first and second plates 14A, 14B by suitable fastening means. The clamps 18B, 18D are also mounted on the upper surface of the respective one of the first and second plates 14A, 14B and are longitudinally moveable relative to the respective fixed jig 18A, 18C to enable insertion and removal of gasket lengths.

Each guide rail 27A, 27B enables the jig and clamp set 16A, 16B to be detachably mounted to the respective one of the first and second plates 14A, 14B. A first jig and clamp set 16A comprises a first jaw 18A and a second jaw 18B. A second jig and clamp set 16B comprises a third jaw 18C and a fourth jaw 18D. The first and third jaws 18A, 18C may be fixed with respect to the first and second plates 14A, 14B respectively. Mounting pins or other fasteners such as, but not limited to, machine screws or bolts may be received in an orifice or aperture 46A, 46B in the first and third jaws 18A, 18C. The second and fourth jaws 18B, 18D may be moveably mounted to the respective one of the first and second plates 14A, 14B. The second jaw 18B may be linearly translated with respect to the first jaw 18A. The fourth jaw 18D may be linearly translated with respect to the third jaw 18C. Optionally, the second jaw 18B is slideably mounted to the first plate 14A. Optionally, the fourth jaw 18D is slideably mounted to the second plate 14B.

A piston arrangement, manually operable by a crank, facilitates opening and closing of the jaws 18A, 18B, 18C, 18D of the jig and clamp sets 16A, 16B. This serves to separate the corresponding jig and clamp sets 16A, 16B to enable insertion and removal of gasket lengths or sections.

In alternative embodiments, the jaws 18A, 18B, 18C, 18D of the jig and clamp sets 16A, 16B open and close by alternative arrangements such as, but not limited to, a rack and pinion or screw thread. The jaws 18A, 18B, 18C, 18D of the jig and clamp sets 16A, 16B open and close automatically, for example, but not limited to, a pneumatic or hydraulically operated piston, and electric motor driving a pinion gear or screw thread.

A first piston 22A is coupled to the second jaw 18B. A second piston 22B is coupled to the fourth jaw 18D. The first piston 22A is slideably mounted in a first mounting bracket 24A; the first mounting bracket 24A is mounted to the first plate 14A. The second piston 22B is slideably mounted in a second mounting bracket 24B; the second mounting bracket 24B is mounted to the second plate 14B.

The first piston 22A may comprise a first magnet 52A for example, but not limited to, a permanent magnet. The second jaw 18B comprises a ferrous or other magnetic material or, alternatively, a further magnet. The first magnet 52A couples the first piston 22A to the second jaw 18B by a force of attraction between the magnet 52A and the magnetic material.

The second piston 22B may comprise a second magnet 52B for example, but not limited to, a permanent magnet. The fourth jaw 18D comprises a ferrous or other magnetic material or, alternatively, a further magnet. The second magnet 52B couples the second piston 22B to the fourth jaw 18D by a force of attraction between the second magnet 52B and the magnetic material.

Figure 5A:
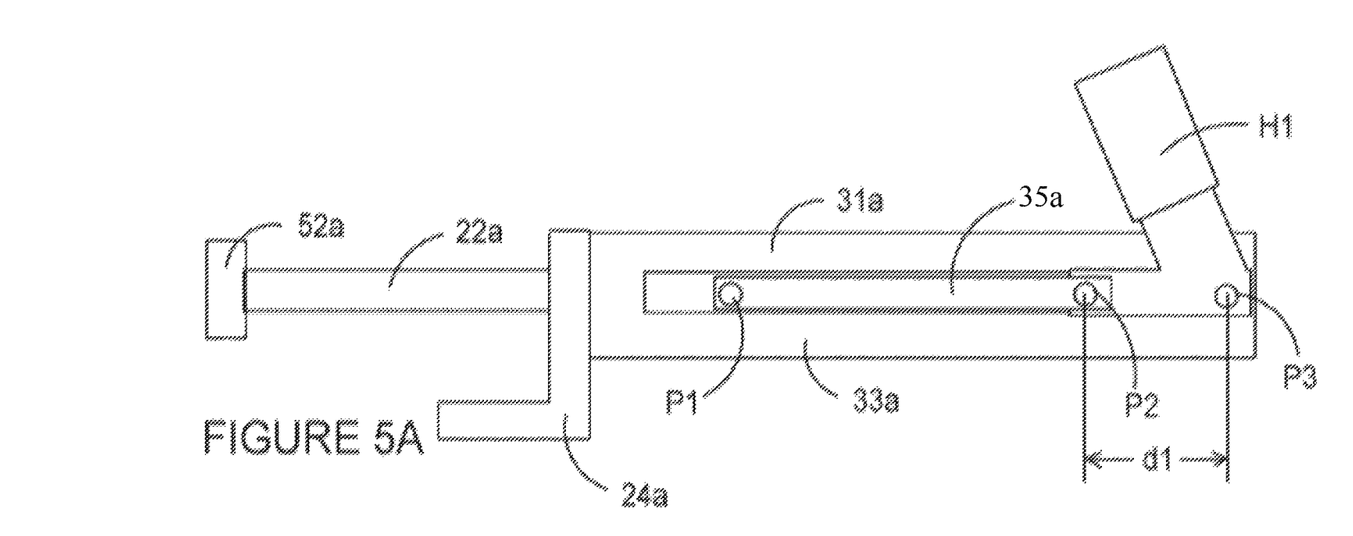
FIG. 5A schematically illustrates an actuator for use with the apparatus of FIG. 1 in a first condition.
Figure 5B:
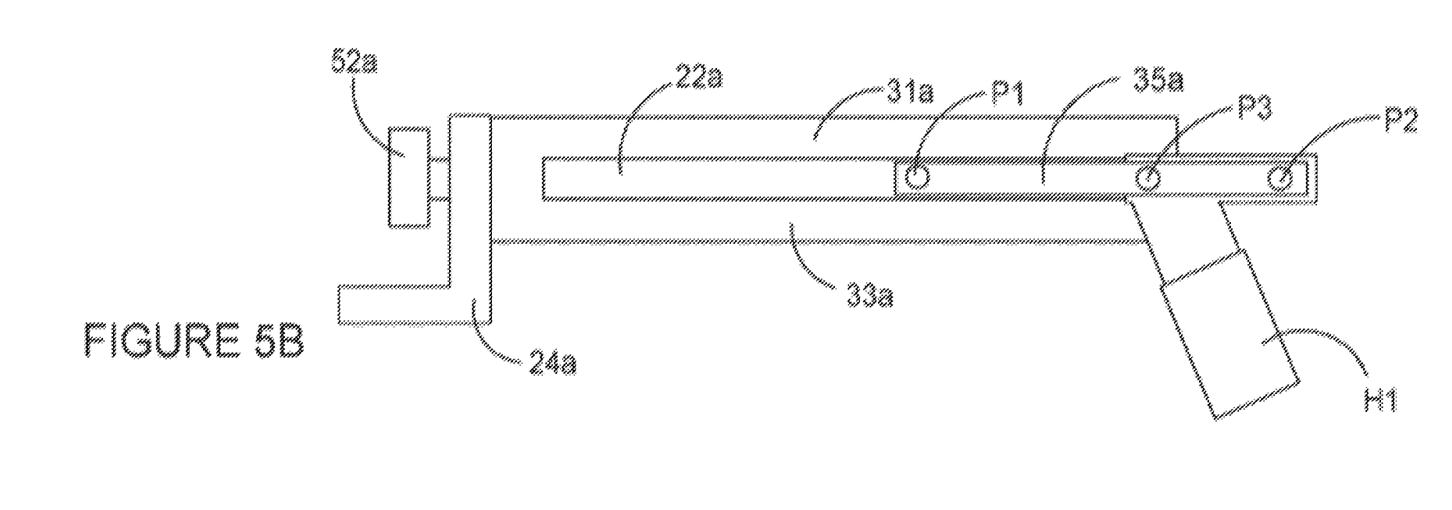
FIG. 5B schematically illustrates an actuator for use with the apparatus of FIG. 1 in a second condition.

The first and second pistons 22A, 22B are mounted between a pair of slide rails 31A, 33A, see FIGS. 5A and 5B. A first end of the slide rails 31A, 33A are mounted to the mounting bracket 24A at a first end thereof. A crank linkage converts the rotary movement of a first or second handle $H_1$, $H_2$ into linear movement of the piston between the pair of slide rails 31A, 33A.

The piston 22A passes through the mounting bracket 24A and terminates at a first end with a magnet 52A. A second end of the piston 22A is pivotally coupled, by a first pivot P1, to a first end of a first linkage 35A. A second, opposing, end of the first linkage 35A is pivotally coupled, by a second pivot $P_2$, to a first handle $H_1$. The handle $H_1$ is pivotally coupled to a second end of the pair of slide rails 31A, 33A by a third pivot $P_3$. The third pivot $P_3$ is spaced apart from the second pivot $P_2$ on the handle $H_1$ by a first distance $d_1$.

The handle $H_1$ can be rotated about third pivot $P_3$ with respect to the pair of slide rails 31A, 33A, so as to effect a linear movement of the piston 22A with respect to the pair of slide rails 31A, 33A. The piston 22A can be moved through a distance corresponding to the first distance $d_1$. The handle $H_1$ may comprise one or more end stops (not shown) to limit the rotational movement of the handle $H_1$. A first end stop may be configured such that when the handle $H_1$ reaches the end of the range of motion defined by the first end stop, the jig and clamp sets 16A, 16B are fully closed and, when inserted, a gasket length is securely held therebetween. The first end stop may also provide feedback to the operator informing them that the jig and clamp sets 16A, 16B are fully closed. The feedback may take the form of haptic feedback—the user may "feel" the handle H1 contact the end stop.

A second end stop may be configured such that when the handle $H_1$ reaches the end of the range of motion defined by the second end stop the jig and clamp sets 16A, 16B are at the maximum separation, defined by the distance $d_1$.

In this way the handle H1 is limited to reciprocating between the first and second end stop.

The piston 22A is moveable through a predefined linear distance.

The handle H1 may also be configured to have an over-centre mechanism. In the illustrated embodiment, the handle H1 is arranged such that the force of gravity acting on the handle H1 biases the handle H1 towards the first end stop as shown in FIG. 5A. The handle H1 is biased towards the second end stop due to the force of gravity as shown in FIG. 5B.

In alternative embodiments a resilient biasing device in the form of a spring may be incorporated to provide a biasing force on the handle $H_1$ towards one of the end stops.

The provision of the overcentre mechanism allows the opening and closing of the jig and clamp sets 16A, 16B be semi-automated. The operator need only manually move the handle H1 past the overcentre position; the biasing force provided by gravity or a resilient biasing device drives the handle H1 to continue moving towards the end stop.

A heater 30, in the form of a vertically extending rectangular block 29, is removably mounted by fasteners 39, through an opening 37 (FIG. 4), to a carriage 64 (FIG. 2) located within the hollow interior of the housing 12. Carriage 64 is mounted for movement along a longitudinally extending guide rail 60. Carriage 64 is configured to normally position the heating element 30 within an apertured protective cage (not shown), at the back of the upper surface of the housing 12, away from gap G between the spaced jig and clamp sets 16A, 16B. Heater element 30 is connected via electrical cables (e.g., electrical line EL1) and connectors 70 to electrical control circuitry, and control interfaces 32, 34, 36, 38, 40 which may include a power switch 32, a temperature sensor, and a known temperature control unit 34, a timer interface 36, a start button 40 and a stop button 38. The heater 30 may comprise a heat resistant (that is to say it remains substantially unaffected by heat at the operative temperatures), non-stick coating or tape such as, but not limited to, polytetrafluoroethylene (PTFE) or silicone in order to prevent or at least mitigate against adhesion of the gasket lengths thereto. The coating may also facilitate cleaning of the heater 30, thus extending its lifetime and improving the quality and consistency of the welded joints. By providing the heater 30 as a removable, unpluggable, unit which can be unplugged from the apparatus, the apparatus can be readily serviced and maintained. In other embodiments the coating may take the form of a sheet material applied to at least the operative surfaces thereof.

Figure 2:
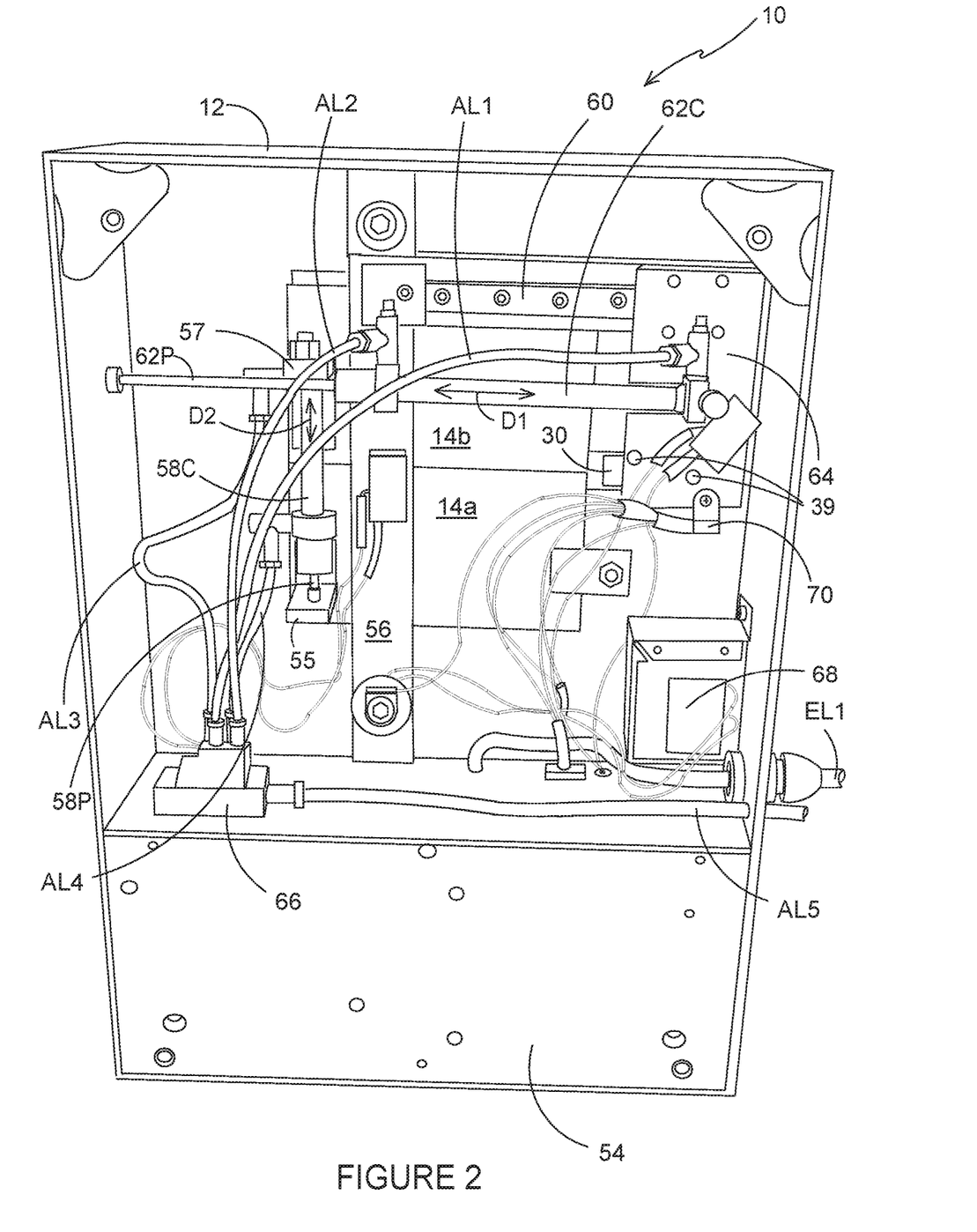
FIG. 2 shows a perspective view from below of the gasket welding apparatus of FIG. 1.
Figure 3:
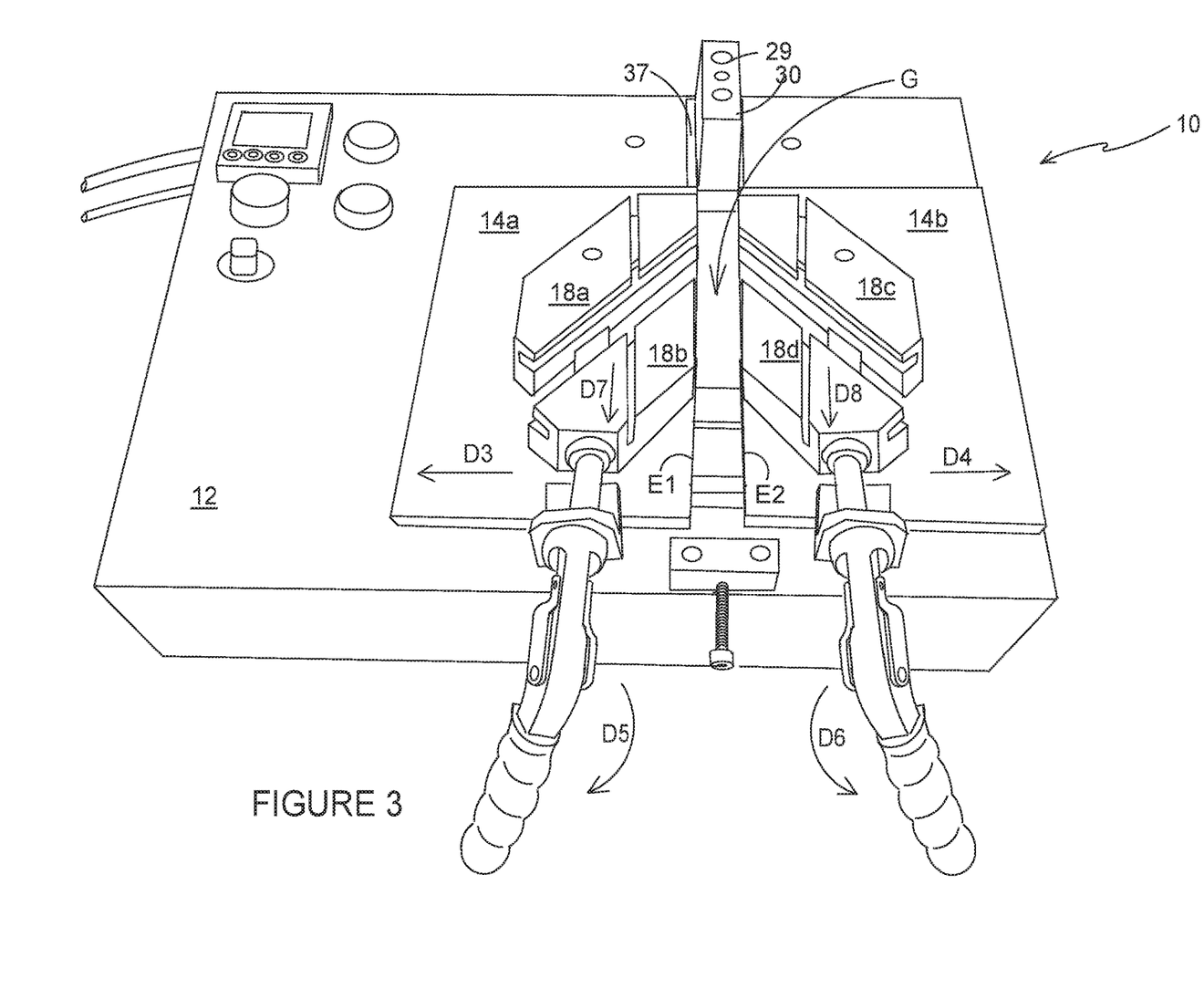
FIG. 3 shows a perspective view from above of the gasket welding apparatus of FIG. 1 in a stage of operation.
Figure 4:
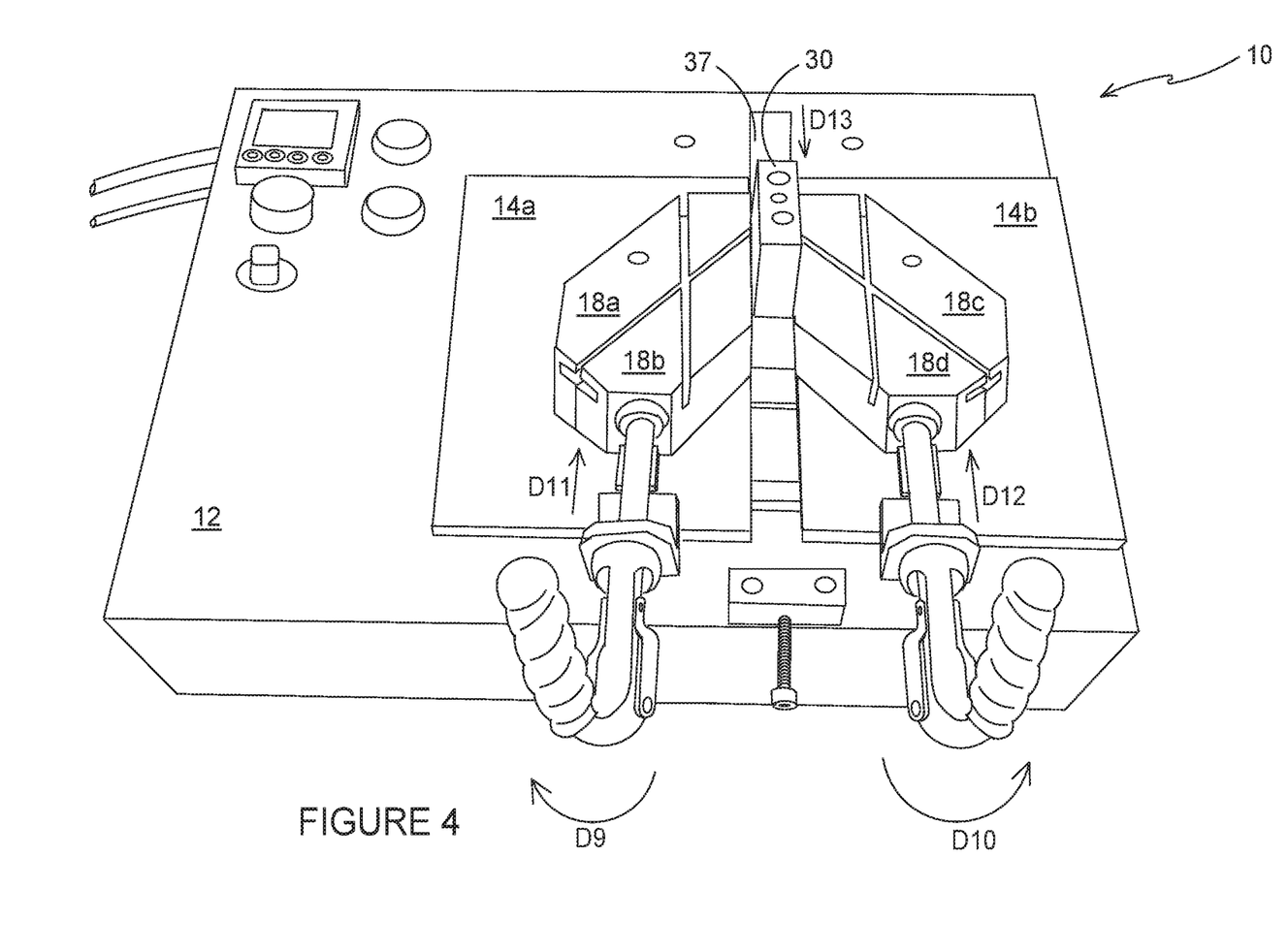
FIG. 4 shows a perspective view from below of the gasket welding apparatus of FIG. 1 in another stage of operation.

Referring now to FIG. 2, the apparatus comprises a first actuator in the form of a piston-cylinder arrangement 62P/62C which drives the carriage 64 in the longitudinal direction indicated by direction arrow D1. The first piston-cylinder arrangement 62P/62C is pneumatically driven. In alternative embodiments the first piston-cylinder arrangement 62P/62C may be hydraulically driven. Airlines AL1, AL2 couple the first piston-cylinder arrangement 62P/62C to a valve unit 66. The valve unit 66 is coupled to an external air compressor (not shown) by airline AL5.

The first and second plates 14A, 14B are each mounted for movement along on a transversely extending guide rail 56.

The apparatus comprises a second actuator in the form of a second piston-cylinder arrangement 58P/58C configured to drive the first and second plates 14A, 14B along the guide rail 56. A first end of the second piston-cylinder arrangement 58 is coupled to the first plate 14A by a mounting bracket 55, and a second end of the second piston-cylinder arrangement 58 is coupled to the second plate 14B, by a mounting bracket 57.

The second piston-cylinder arrangement 58P/58C drives the first and second plates 14A, 14B in the transverse direction indicated by direction arrow D2. The second piston-cylinder arrangement 58P/58C is pneumatically driven. In alternative embodiments the second piston-cylinder arrangement 58P/58C may be hydraulically driven. Airlines AL3, AL4 couple the second piston-cylinder arrangement 58P/58C to the valve unit 66.

The first and second piston-cylinder arrangements 62P/62C, 58P/58C are double acting cylinders; it will be appreciated that in alternative embodiments a pair of single acting piston-cylinder arrangements may be arranged in opposition.

The apparatus 10 comprises a compartment 54. The compartment 54 houses a control unit 68. The control unit 68 is communication with the valve unit 66, the heater 30, the temperature sensor, and the control interfaces 32, 34, 36, 38, 40 provided on the upper surface of the housing 12.

The control unit 68 comprises or is in communication with a thermostat and controls the heater 30 so as to maintain a temperature setting selected by a temperature control unit 34.

The control unit 68 is configured to control the valve unit 66 so as to activate the first and second piston-cylinder arrangements 62P/62C, 58P/58C.

Figure 1:
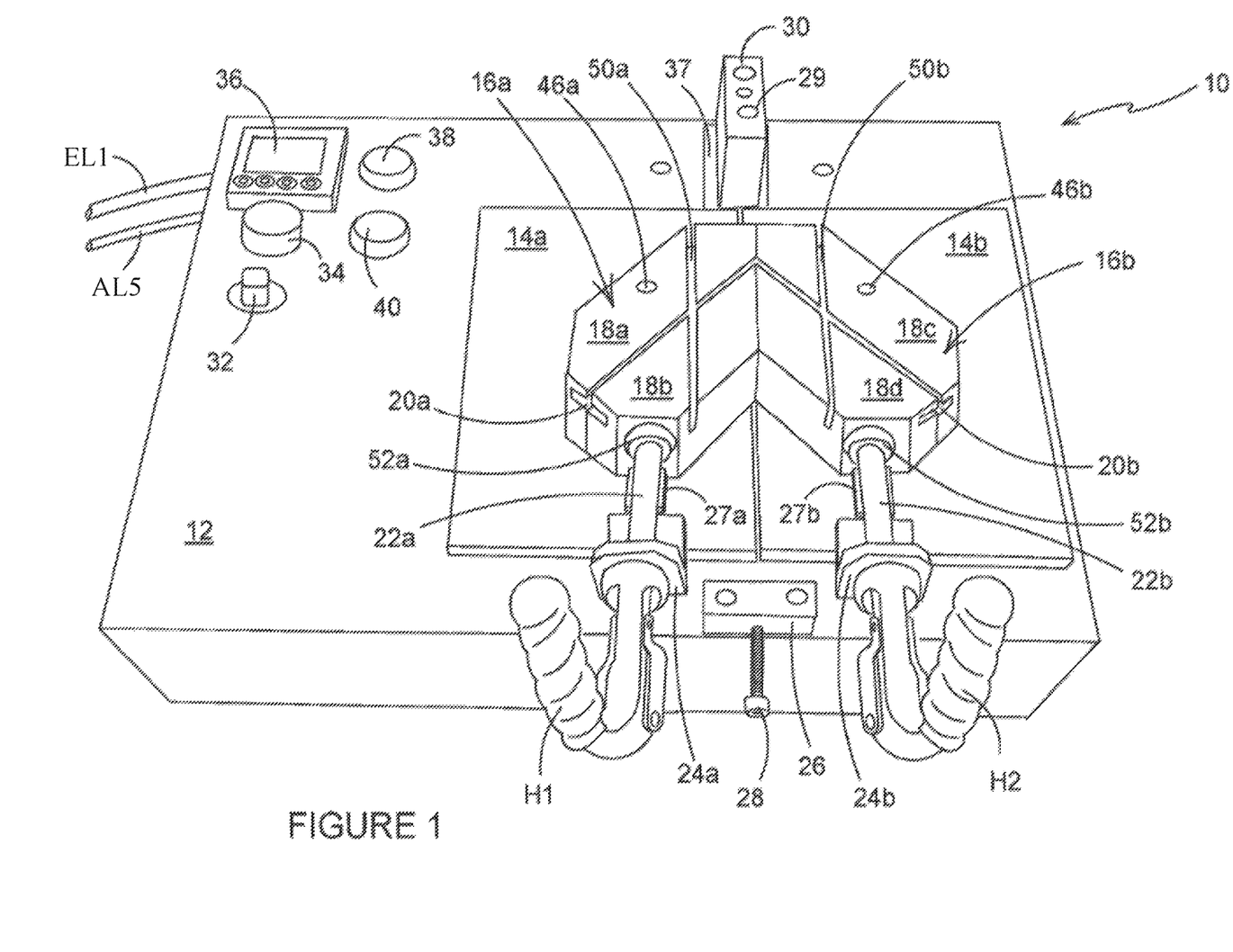
FIG. 1 shows a perspective view from above of a gasket welding apparatus according an embodiment of the present disclosure.

Heater block 29 normally occupies a position, shown in FIG. 1, shielded within the confines of a box-like apertured cage (not shown). The cage functions to keep hot surfaces confined when block 29 is not actively engaged in the welding process. Block 29 may include an upward projection which can be used for manual spot welding and feathering of the gaskets. The cage may be mounted to the back of the housing 12 by a hinge attachment plate, which enables the cage to be pivoted backwards about a pin to expose the projection. The lower front of the cage may be provided at the sides with outwardly laterally extending horizontal lugs. The lugs may comprise apertures through which means, such as threaded fasteners, may be passed to engage with housing 12, for releasably locking the cage in a shielding position about heater block 29.

As mentioned above, heater block 29 is mounted atop carriage 64 for transportation longitudinally. Movement of the carriage 64 effects movement of the heater block 29 between a first, rest, position shown in FIG. 1 and a second, advanced, position shown in FIG. 4. The carriage 64 is driven by the first piston-cylinder arrangement 62 under the control of the control unit 68.

The jig and clamp sets 16A, 16B are provided with gasket cutting guides 50A, 50B to permit a user to cut the ends of the gasket lengths prior to welding. The gasket cutting guides are in the form of a pair of aligned slots 50A, 50B provided on the jig 18A, 18C and clamp 18B, 18D respectively. The aligned slots define a line across one of the hollow channels 20A, 20B at an angle of 45° to the respective channel 20A, 20B. This permits the ends of the gasket lengths to be cut with beveled ends at an angle of 45°, which in turn enables the welding together of the gasket lengths at right angles. It is most common for gasket lengths to be welded together at right angles; however, the gasket cutting guide means 50A, 50B may conveniently be provided at any suitable angle as required.

In order to cut a length of gasket material the jig and clamp set 16A, 16B must first be opened and a length of gasket material inserted. This can be achieved by pivoting the handles H1, H2 as indicated by direction arrows D5, D6 in FIG. 3, so as to withdraw the pistons 22A, 22B to a retracted position as shown in FIG. 5B. The jig and clamp set 16A, 16B may then be closed to securely support the gasket length by pivoting the handles H1, H2 in an opposite direction so as to extend the pistons 22A, 22B as shown in FIG. 1.

A Stanley® knife, or other suitable cutting implement, may then be drawn across the line defined by the slots 50A, 50B to cut the gasket material. Alternatively, if the apparatus 10 is provided with integral cutting means, the cutting means may be actuated to cut the gasket lengths. In some embodiments the integral cutting means may take the form of a heated wire or blade.

The jig and clamp sets 16A, 16B may be used to cut complementary left and right lengths of gasket material. Once the lengths of gasket material have been cut the jig and clamp sets 16A, 16B must be opened slightly, to release the jig and clamp sets 16A, 16B grip or hold on the gasket lengths. The lengths of gasket material are then moved such that the beveled edges are in alignment with the inner edges of the jig and clamp sets 16A, 16B for welding. The jig and clamp sets 16A, 16B are then closed to secure or hold the gasket lengths in position for welding.

The operator can define the operating temperature of the heater 30 and the dwell time—the time period for which the heater block 29 is brought into contact with the beveled edges of the gasket lengths.

The operator then activates the welding operation of the apparatus 10 by actuating the start switch or button 40. The control unit 68 acts to separate the first and second plates 14A, 14B. The first and second plates 14A, 14B, and hence the jig and clamp sets 16A, 16B, are separated by extending the second piston cylinder arrangement 58P/58C. The valve unit 66 receives an instruction to open a first valve in communication with an outstroke port of the cylinder 58C. Fluid, optionally air, enters the cylinder 58C causing the piston 58P to be extended.

In one embodiment, the control unit 68 acts to separate the first and second plates 14A, 14B, and hence the jig and clamp sets 16A, 16B, to create a gap therebetween which is greater than the transverse dimension of the heater block 29. This provides clearance to allow the heater block 29 to be moved into position. It serves also to prevent the beveled edges of the gasket lengths being dragged or slid across the surface of the heater block 29.

The control unit 68 then acts to bring the heater block 29 into position between the jig and clamp sets 16A, 16B such that the heater block 29 is disposed between the beveled edges of the gasket lengths. The carriage 64 and hence heater block 29 are driven into an operative position by retracting the first piston cylinder arrangement 62P/62C. The valve unit 66 receives an instruction to open a second valve in communication with an instroke port of the cylinder 62C. Fluid, optionally air, enters the cylinder 58C causing the piston 62P to be retracted.

The control unit 68 acts to bring the beveled edges of the gasket lengths into contact with the heater block 29 by moving the first and second plates 14A, 14B, and hence the jig and clamp sets 16A, 16B, towards each other.

The beveled edges of the gasket lengths are held in contact with the heater block 29 for a predefined period of time. The operator defines the operating temperature of the heater 30 and the dwell time before activating the welding operation of the apparatus 10. The operator selects the temperature and dwell time desired to liquefy or melt the beveled edges of the gasket lengths sufficient to ensure a strong bond joint throughout the profile of the gasket.

Once the beveled edges of the gasket lengths have been held in contact with the heater block 29 for the desired period of time the control unit 68 acts to bring the molten beveled edges of the gasket lengths into contact. The control unit 68 first acts to return the heater block 29 into the rest position. The carriage 64 and hence the heater block 29 are driven into the rest position by extending the first piston cylinder arrangement 62P/62C. The valve unit 66 receives an instruction to open a third valve in communication with an outstroke port of the cylinder 62C. Fluid, optionally air, enters the cylinder 58C causing the piston 62P to be extended.

The control unit 68 acts to bring the first and second plates 14A, 14B, and hence the jig and clamp sets 16A, 16B, into abutment, or at least into close proximity such that the molten beveled edges of the gasket lengths are in abutment. The control unit 68 acts to move the first and second plates 14A, 14B by retracting the second piston cylinder arrangement 58P/58C. The valve unit 66 receives an instruction to open a fourth valve in communication with an instroke port of the cylinder 58C. Fluid, optionally air, enters the cylinder 58C causing the piston 58P to be retracted.

The molten beveled edges of the gasket lengths are brought into abutment and bonded together. The molten beveled edges of the gasket lengths are allowed to cool thereby solidifying or hardening. The operator then opens the jig and clamp set 16A, 16B. This is achieved by pivoting the handles H1, H2 as indicated by direction arrows D5, D6 in FIG. 3, so as to withdraw the pistons 22A, 22B to a retracted position as shown in FIG. 5B. The welded gasket lengths are then removed.

In some embodiments the control unit 68 heats the heater block 29 to the predefined temperature before commencing the automated welding operation described above. The apparatus 10 may comprise a visual (light) or audio (buzzer or beep) indication that the heater block 29 has reached the predefined temperature.

In some embodiments the first and second piston-cylinder arrangements 62P/62C, 58P/58C may be in communication with a reservoir (not shown). The valve unit 66 may be operable to return fluid to the reservoir. For example, when the valve unit 66 opens the valve in communication with an outstroke port of the cylinder to allow fluid to enter, thereby causing the piston to be extended, the valve unit 66 may also open a further valve, for example the valve in communication with the instroke port of the cylinder, to allow fluid in the cylinder on the instroke side to be exhausted through the instroke port to the reservoir. In still other embodiments the further valve may allow air in the cylinder on the instroke side to be vented into the atmosphere.

Optionally, the apparatus 10 comprises a locking device for securing the first and second plates 14A, 14B, and hence the jig and clamp sets 16A, 16B, in a closed position. This may prevent or reduce the likelihood of the apparatus 10 becoming damaged when in an inactive state, for example when being transported. The locking mechanism comprises a pin 28 mounted in and extending through a bore in a mounting block 26. The mounting block 26 is secured to the housing 12. The pin 28 is retained in the bore by flanges at either end thereof. The flange at a first end is configured to be received in a cutaway, recess or rebate in each of the first and second plates 14A, 14B. A resilient biasing device takes the form of a coil spring in a state of compression and biases the first end of the pin 28 towards the mounting block 26. The resilient biasing device is provided between the flange at the second end of the pin and the mounting block 26.

To secure the first and second plates 14A, 14B in a closed position. An operator applies a force to the pin 28 to overcome the biasing force of the spring such that the flange at the first end of the pin 28 is located between the first and second plates 14A, 14B. The first and second plates 14A, 14B are closed about the pin 28. A portion of the pin 28 is received in the rebate in each of the first and second plates 14A, 14B. The operator removes the force from the pin 28. The spring biases the flange of the pin 28 against a surface of each of the first and second plates 14A, 14B defined by the rebate. The flange of the pin 28 frictionally engages with the said surfaces so as to hold the first and second plates 14A, 14B in a closed position.

There are many different gaskets each having different characteristics including, but not limited to, gasket shape or profile, material, size. The temperature setting and dwell time may be optimized for a given set of gasket characteristics. Different gasket profiles and sizes may require a different jig and clamp set; the operator may select a given jig and clamp set for a given gasket profile or size. Each jig and clamp set may comprise an identifier which can be read by the apparatus 10. Optionally, the apparatus 10 comprises a memory storage device including a plurality of preset programs which predefine an optimized temperature setting and a dwell time that the apparatus implements for a given set of gasket characteristics. The operator may select a particular preset program for the gasket to be welded; the apparatus 10 then implements the program heating the heater block 29 to the predefined temperature and holding the gasket lengths in contact with the heater block 29 for a predefined period of time.

Optionally, the apparatus 10 comprises a counter which keeps a tally or count of the number of welds the apparatus has performed. The counter may take the form of a mechanical or electronic device which senses that the heater block 29 and/or carriage 64 has moved from the rest position to the operative position and back again. The counter may take the form of a sensor which detects that the start button 40 has been pressed or that the second piston-cylinder arrangement 58P/58C has been extended and/or retracted. The counter may facilitate servicing and maintenance of the apparatus 10; the counter may provide an operator with an indication that service of the apparatus 10 should be carried out in accordance with a prescribed schedule.

Optionally, the apparatus 10 comprises a recording device to record information about use of the apparatus 10. The apparatus 10 comprises or is in communication with a memory storage device which records information regarding the use of the apparatus 10. The apparatus 10 may include a tracking device to determine the geographical locations in which apparatus 10 is operated. The recording device may record for example the geographical locations of use, number of welds carried out, the preset program which is implemented, and the shape or profile of the jig and clamp set used.

It can be appreciated that various changes may be made within the scope of the present invention.

It will be recognized that as used herein, directional references such as "top", "bottom", "front", "back", "end", "side", "inner", "outer", "upper" and "lower" do not limit the respective features to such orientation, but merely serve to distinguish these features from one another.

What is claimed is:

1. A gasket welding apparatus comprising:
    a portable housing;
    a first carrier plate coupled to the portable housing;
    a first clamping member, coupled to the first carrier plate, for supporting a first length of gasket material, the first clamping member comprising a first pair of jaws being moveable towards and away from one another;
    a second carrier plate coupled to the portable housing;
    a second clamping member, coupled to the second carrier plate, for supporting a second length of gasket material, the second clamping member comprising a second pair of jaws being moveable towards and away from one another;
    the first and second carrier plates being movable relative to the portable housing and with respect to each other between an open position and a closed position to move the first and second clamping members toward and away from one another relative to the portable housing and with respect to each other;
    a first actuator for moving the first and second carrier plates toward one another into the closed position and away from one another into the open position;
    a locking device for selectively securing the first and second clamping members in the closed position, the locking device comprising;
        a locking pin coupled to the portable housing, the locking pin being linearly movable relative to the portable housing and with respect to the first and second carrier plates between a locked position, in which the locking pin is engaged with the first and second carrier plates to secure the first and second carrier plates in the closed position, and an unlocked position, in which the locking pin is disengaged from the first and second carrier plates to enable movement of the first and second carrier plates with respect to one another; and
        a spring-biasing device coupled to the locking pin for biasing the locking pin in the locked position, when the locking pin is engaged with the first and second carrier plates, and the unlocked position, when the locking pin is disengaged from the first and second carrier plates;
    a heating element coupled to the portable housing, the heating element being moveable between a first position, in which the heating element is removed from between the first and second clamping members and a second position, in which the heating element is disposed between the first and second clamping members;
    a second actuator for moving the heating element between the first position and the second position; and
    a control unit for controlling operation of the first and second actuators.

2. The gasket welding apparatus of claim 1, wherein the apparatus comprises a temperature controller for controlling the temperature of the heating element.

3. The gasket welding apparatus of claim 2, wherein the temperature controller comprises a temperature sensor.

4. The gasket welding apparatus of claim 3, wherein the control unit is in communication with the temperature controller.

5. The gasket welding apparatus of claim 4, wherein the control unit comprises a timer.

6. The gasket welding apparatus of claim 5, wherein the control unit activates the second actuator so as to move the heating element from the second position to the first position in response to receiving a signal from the timer.

7. The gasket welding apparatus of claim 6, wherein the control unit activates the first actuator so as to move the first and second clamping members towards each other.

8. The gasket welding apparatus of claim 1, further comprising a gasket cutting guide for providing a guide to enable lengths of gasket material to be cut in preparation for welding, wherein the gasket cutting guide comprises a slot in at least one of the clamping members which defines a line at which the gasket is to be cut.

9. The gasket welding apparatus of claim 8, wherein each of the clamping members is provided with the gasket cutting guide.

10. The gasket welding apparatus of claim 8, wherein the apparatus is provided with a heated gasket cutter in conjunction with the gasket cutting guide.

11. The gasket welding apparatus of claim 1, wherein the heating element is detachably coupled to the apparatus.

12. The gasket welding apparatus of claim 1, wherein the heating element comprises a thermally resistant, non-stick material on operative surfaces thereof.

13. The gasket welding apparatus of claim 1, wherein at least one of the jaws of the first pair of jaws is reciprocally moveable along a first path having a first end defined by a first end stop, the at least one of the jaws being biased towards the first end stop.

14. The gasket welding apparatus of claim 1, wherein the first pair of jaws is moveable towards and away from one another by an overcentre mechanism.

15. The gasket welding apparatus of claim 13, wherein the first path comprises a second end defined by a second end stop, the first pair of jaws being coupled to an overcentre mechanism, the at least one the jaws being biased towards the first or second end stop in dependence upon the state of the overcentre mechanism.

16. The gasket welding apparatus of claim 1, wherein the apparatus comprises at least one preset welding program defining a set of instructions configured for welding gasket lengths in dependence upon the gasket characteristics.

17. The gasket welding apparatus of claim 1, wherein:
the first carrier plate comprises a first recess and the second carrier plate comprises a second recess, the first and second recesses being aligned with and adjacent to one another when the first and second carrier plates are in the closed position;
the locking device further comprises a mounting block coupled to the portable housing, the locking pin is coupled to and is movable relative to the mounting block;
the locking pin comprises:
    a shaft extending through the mounting block and having a first end and an opposed second end;
    a first flange disposed on the first end of the shaft; and
    a second flange disposed on the second end of the shaft;
the spring-biasing device comprises a coil spring disposed around the shaft and located between the mounting block and the second flange;
with the locking pin in the locked position, the first flange engages the first and second recesses to secure the first and second carrier plates in the closed position and the coil spring acts on the second flange to maintain engagement between the first flange and the first and second recesses; and
with the locking pin the unlocked position, the coil spring acts on the second flange to move the first flange away from the first and second carrier plates.

18. A gasket welding apparatus comprising:
a pair of opposed carrier plates coupled to a portable housing, the carrier plated being movable relative to the portable housing between an open position and a closed position;
a pair of opposed clamping members for supporting corresponding left and right lengths of a gasket material, each one of the clamping members being coupled to a respective one of the carrier plates, and the clamping members being moveable toward and away from one another when the carrier plates move between the closed and open positions, respectively;
a locking device for selectively restricting movement of the clamping members relative to each other; and
a locking pin coupled to the portable housing, the locking pin being linearly movable relative to the portable housing and with respect to the carrier plates between a locked position, in which the locking pin is engaged with the carrier plates to secure the carrier plates in the closed position, and an unlocked position, in which the locking pin is disengaged from the carrier plates to enable movement of the carrier plates with respect to one another;
a spring-biasing device coupled to the locking pin for biasing the locking pin in the locked position, when the locking pin is engaged with the carrier plates, and the unlocked position, when the locking pin is disengaged from the carrier plates; and
a heating element, the heating element being moveable between a first position, in which the heating element is removed from between the clamping members and a second position, in which the heating element is disposed between the clamping members; and
wherein the heating element comprises a thermally resistant, non-stick material on operative surfaces thereof.

19. The gasket welding apparatus of claim 18, wherein the heating element is detachably coupled to the apparatus.

* * * * *